(12) United States Patent
Hobbs

(10) Patent No.: US 6,510,737 B1
(45) Date of Patent: Jan. 28, 2003

(54) INERTIAL RATE SENSOR AND METHOD WITH IMPROVED TUNING FORK DRIVE

(75) Inventor: Larry P. Hobbs, Brentwood, CA (US)

(73) Assignee: BEI Technologies, Inc., San Francisco, CA (US)

( * ) Notice: Subject to any disclaimer, the term of this patent is extended or adjusted under 35 U.S.C. 154(b) by 18 days.

(21) Appl. No.: 09/663,742

(22) Filed: Sep. 15, 2000

(51) Int. Cl.[7] ............................................. G01P 21/00
(52) U.S. Cl. .................. 73/504.12; 73/1.37; 73/504.16
(58) Field of Search ................................. 73/1.38, 1.39, 73/1.77, 504.12, 504.13, 504.14, 504.15, 504.16, 504.04; 310/316, 317, 329

(56) References Cited

U.S. PATENT DOCUMENTS

| | | | | |
|---|---|---|---|---|
| 5,652,374 A | * | 7/1997 | Chia et al. ................... 73/1.38 |
| 5,889,193 A | * | 3/1999 | Pfaff et al. ................... 73/1.37 |
| 5,900,529 A | * | 5/1999 | Hanisko et al. ............... 73/1.38 |
| 5,939,630 A | * | 8/1999 | Nozoe et al. ................. 73/1.77 |
| 5,942,686 A | | 8/1999 | Bhardwaj ................. 73/504.16 |

\* cited by examiner

*Primary Examiner*—Helen Kwok
(74) *Attorney, Agent, or Firm*—Edward S. Wright

(57) ABSTRACT

Inertial rate sensor and method in which a drive signal consisting initially of a square wave and thereafter a sine wave is applied to a vibratory rate sensing element, a pickup circuit is coupled to the rate sensing element for providing an output signal corresponding to movement of the rate sensing element, the magnitude of the drive signals is adjusted to set a scale factor which determines the sensitivity to movement of the rate sensing element, and a signal in the drive circuit is monitored to detect a failure.

47 Claims, 2 Drawing Sheets

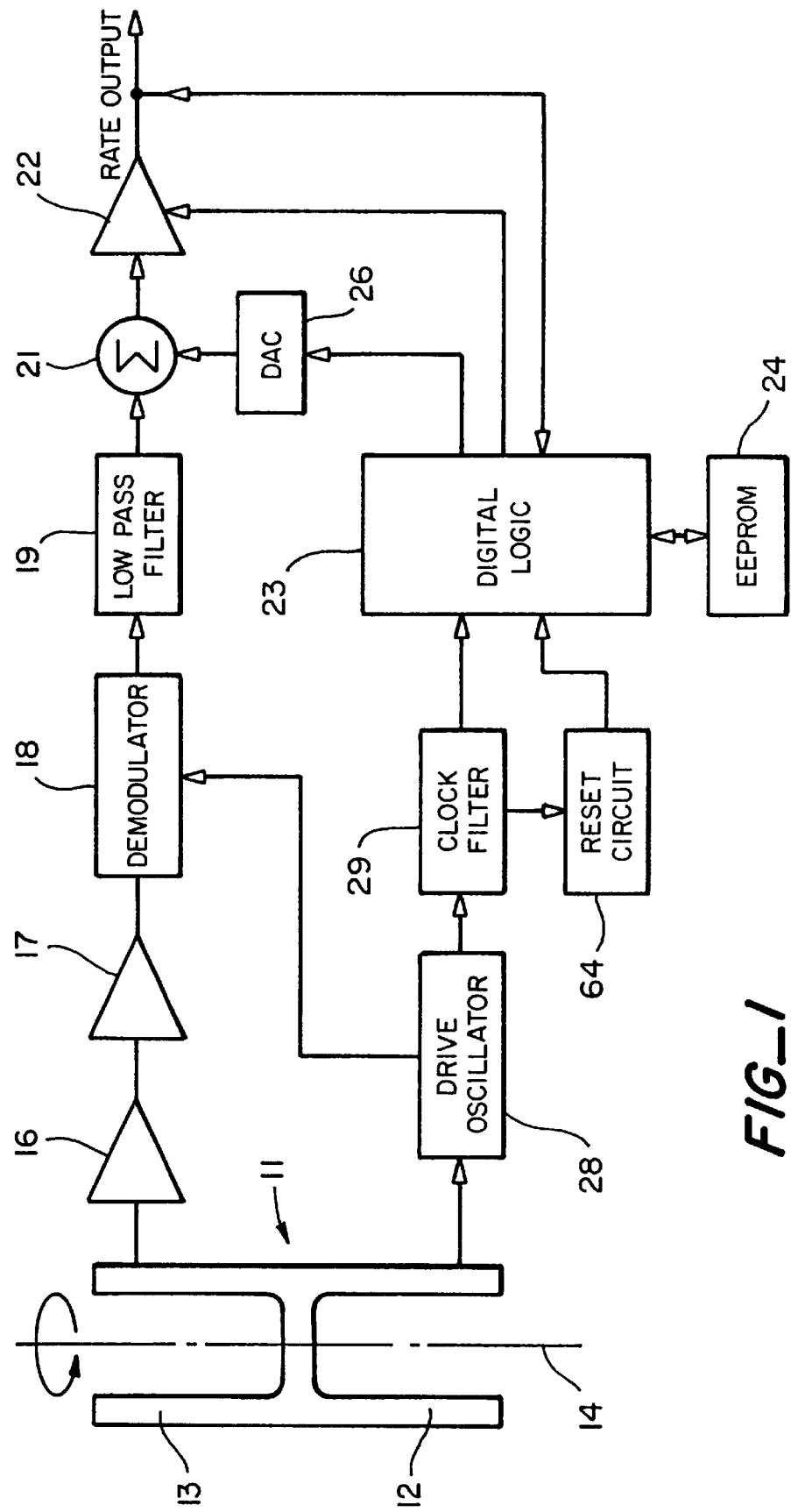
FIG_1

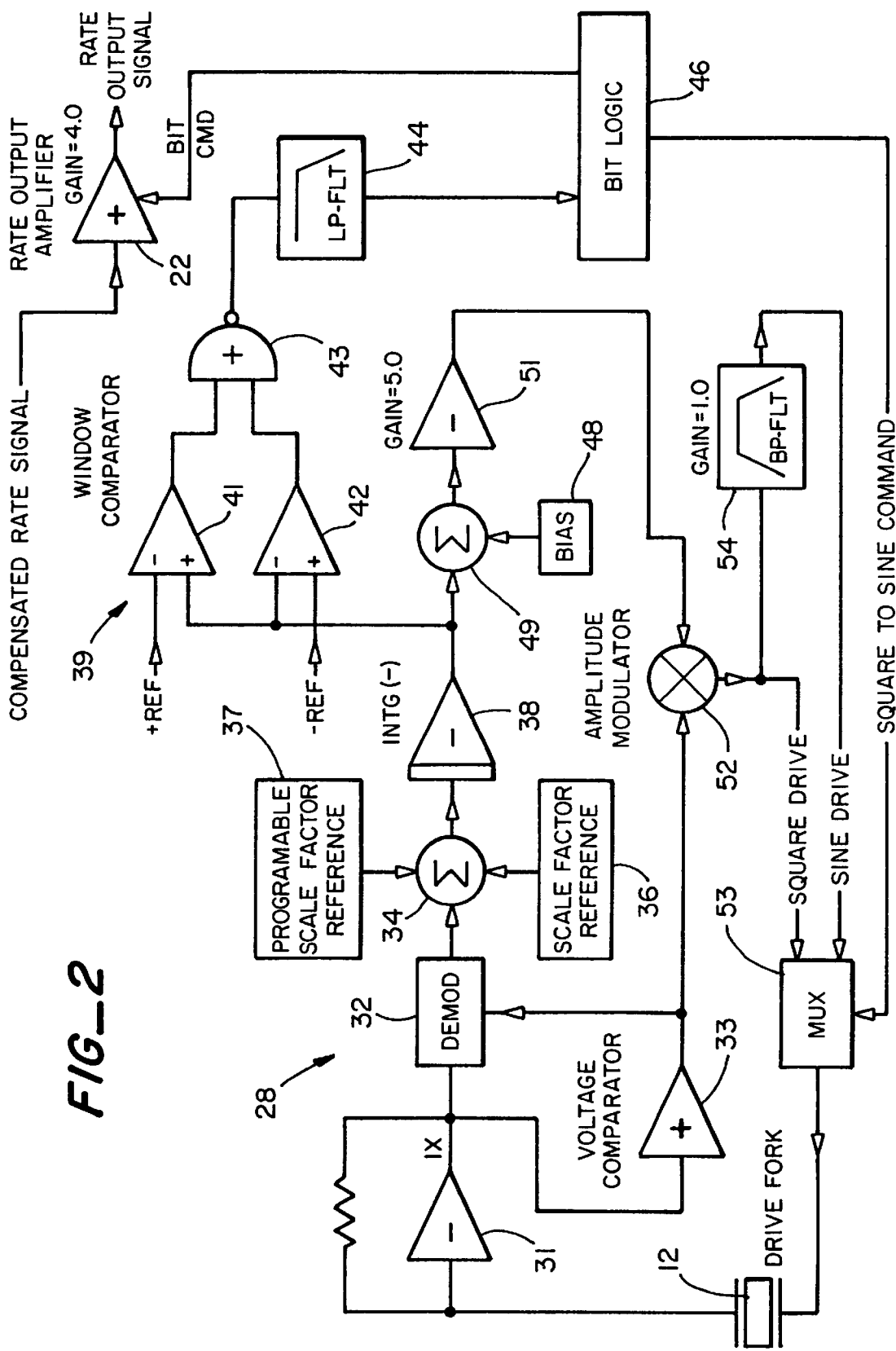
FIG_2

INERTIAL RATE SENSOR AND METHOD WITH IMPROVED TUNING FORK DRIVE

BACKGROUND OF THE INVENTION

1. Field of Invention

This invention pertains generally to inertial rate sensors and, more particularly, to an inertial rate sensor and method with improved tuning fork drive.

2. Related Art

Inertial rate sensors are used in a wide variety of applications including aircraft navigation, the guidance of missiles and spacecraft, and automotive stability control systems. In many of these applications, safety is critical, and measures must be taken to guard against failures of the sensor.

OBJECTS AND SUMMARY OF THE INVENTION

It is in general an object of the invention to provide a new and improved inertial rate sensor and method.

Another object of the invention is to provide an inertial rate sensor and method with improved tuning fork drive.

These and other objects are achieved in accordance with the invention by providing an inertial rate sensor and method in which a drive signal consisting initially of a square wave and thereafter a sine wave is applied to a vibratory rate sensing element, a pickup circuit is coupled to the rate sensing element for providing an output signal corresponding to movement of the rate sensing element, the magnitude of the drive signals is adjusted to set a scale factor which determines the sensitivity to movement of the rate sensing element, and a signal in the drive circuit is monitored to detect a failure.

BRIEF DESCRIPTION OF THE DRAWINGS

FIG. 1 is a block diagram of one embodiment of an inertial rate sensor incorporating the invention.

FIG. 2 is block diagram of the drive oscillator in the embodiment of FIG. 1.

DETAILED DESCRIPTION

As illustrated in FIG. 1, the rate sensor includes a quartz sensing element 11 in the form of a double-ended tuning fork. This tuning fork is fabricated of single crystal quartz material, and has an H-shaped configuration, with drive tines 12 at one end and pick-up tines 13 at the other. Each pair of tines is disposed symmetrically about the longitudinal axis 14 of the tuning fork.

The drive tines are driven to oscillate at the natural frequency of the tuning fork and in the plane of the tuning fork. When the tuning fork is subjected to rotation about its longitudinal axis, the Coriolis force causes the tines to deflect out of the plane of the fork, stimulating the pickup mode of oscillation. The drive and pickup signals are coupled to the tines in a conventional manner by the use of electrodes (not shown), with the drive signals stimulating piezoelectric vibration of the tines and the pickup signals being in the form of electric charge generated piezoelectrically in response to strain produced by the Coriolis force.

Although the sensing element is illustrated as being a double ended tuning fork, another type of vibratory sensing element, including a single ended tuning fork, can also be utilized, if desired.

The pickup signals pass through a charge amplifier 16, to a preamplifier 17, and then to a demodulator 18. The signals from the demodulator pass through a low pass filter 19 to a compensation summer 21 and then to an output amplifier 22, with the rate output signal appearing at the output of the output amplifier. With voltage inputs of +5 volts and 0 volts, the rate output is biased to +2.5 volts for zero input and swings to a more positive voltage for positive rate inputs and toward zero volts for a negative rate input. The +2.5 volt level is often referred to as virtual ground.

Compensation signals are applied to the summer to adjust the output signal for factors such as temperature and to make the system ratiometric so that the scale factor of the unit varies in direct proportion to the applied power, as described in U.S. Pat. No. 5,942,686.

The system includes digital logic 23 which operates in conjunction with an external EEPROM 24 whereby the unit can be calibrated electronically without the need for hand-soldered components. The digital logic also provides a built-in test function for detecting the occurrence of faults in the unit. Signals from the digital logic are applied to compensation summer 21 through a digital-to-analog converter 26 and to output amplifier 22.

The vibratory sensing element or tuning fork 11 is used as the clock reference for the digital logic, with clock signals derived from the drive circuit or oscillator 28 being applied to the digital logic through a clock filter 29. The clock filter prevents incorrect clock signals from being delivered in response to spurious oscillations both during start-up and during continuous operation, and it also ensures the same fixed phase relationship will always exist between the system clock and the oscillations of the tuning fork.

Using the tuning fork as the frequency determining element for the system clock reduces the size and cost of the rate sensor by eliminating the need for an external clock and thereby reducing the overall part count and circuit board area. It also simplifies the task of fault detection since monitoring tuning fork integrity automatically monitors the integrity of the clock signal. In addition, the clock signal is synchronous with the output signal, and there can be no aliased signals or beat tones at sum and difference frequencies.

In the preferred embodiment, the fundamental frequency of the tuning fork is used as the clock reference for the digital logic. Alternatively, a phase-locked loop can be utilized to generate a multiple of the fork drive frequency for faster signal processing. In either case, the frequency determining element is the same tuning fork that serves as the sensing element.

As illustrated in FIG. 2, the drive circuit or oscillator 28 comprises a loop which is sometimes referred to as an AGC (automatic gain control) servo loop. When the drive tines are oscillating, a current is generated across the drive electrodes. This current is passed through a current-to-voltage amplifier 31 to produce a voltage which is applied to the input of a demodulator 32. A voltage comparator 33 connected to the output of the current-to-voltage amplifier produces a square wave at the drive frequency. This square wave is applied to the control input of the demodulator, and with the demodulator operating at the drive frequency, its output includes a term at dc.

The dc term from the demodulator is applied to a summing circuit 34 where it is combined with a fixed scale factor reference voltage 36 and a programmable scale factor reference voltage 37. The output of the summing circuit is connected to the input of an integrator 38.

The output of the integrator will move either toward a more positive voltage or toward a more negative voltage if its input is non-zero. This means that in a steady state condition, the input to the integrator must, on average, be zero. Thus, the output of the demodulator must exactly cancel the sum of the two scale factor reference voltages. Since the output voltage of the demodulator represents the amplitude of oscillation of the drive mode of the tuning fork, the two scale factor reference voltages set the magnitude of the drive mode oscillation.

The rate sensing capability of the tuning fork depends on the Coriolis force which couples input rotation about the axis of symmetry of the drive tines to an out-of-plane torsional mode. The Coriolis force is proportional to the product of the rate of rotation and the velocity of the tines, and that velocity is proportional to the amplitude of the tine oscillation. Thus, as the tines are driven to oscillate with a greater amplitude of displacement and velocity, the response to rotation via the Coriolis force will be proportionally greater. Thus, the scale factor, or response per unit rotation of the tuning fork, increases proportionally with the drive amplitude.

In determining the amplitude of oscillation of the drive mode of the tuning fork, scale factor reference voltages 36, 37 also determine the scale factor of the device. The fixed voltage is used to set the nominal scale factor, and the programmable voltage is used for fine adjustment. This permits the scale factor of each unit to be corrected for minor variations in individual tuning fork characteristics so that each rate sensor produced can have the proper scale factor output.

The programmable data for setting the programmable scale factor reference voltage is derived from a digital coefficient stored in EEPROM 24 and accessed by digital logic 23. That data is converted to an analog voltage which is applied to the programmable bias voltage input of summing circuit 34. In one presently preferred embodiment, the range of adjustment of the programmable component of the scale factor reference is on the order of ±35 percent of the fixed component.

The voltage level at the output of integrator 38 is monitored by a window comparator 39 which detects unacceptable conditions or failures in the drive loop. The window comparator comprises a pair of comparators 41, 42 and an inverting OR gate 43, with the outputs of the comparators being connected to the inputs of the inverting OR gate. The upper and lower voltage limits are set by reference voltages +REF and –REF which define the trip points of the circuit. The other two comparator inputs are connected together for receiving the signal from the integrator. The output of the inverting OR gate is passed through a low pass filter 44 and monitored by the built-in test logic.

As long as the output of the integrator is within the limits set by reference voltages, the output of the window comparator will be determined to be acceptable by the built-in test logic 46. If at any time the output of the integrator should fall outside these limits, the test logic will detect a failure and trigger output stage 22 to shift its output rapidly to the positive voltage rail, which is interpreted as a failure condition.

The types of failures which can be detected within the oscillator loop include a defective or broken tuning fork, an open electrical trace leading to or from the fork, a change in the fork mode "Q" factor caused by a leak in the backfill gas of the package in which the tuning fork is encapsulated, and a shorted or open feedback component across the integrator.

To permit failures of the integrator to be detected by the built-in test logic, the output of the integrator is combined with a bias voltage 48 in a summing circuit 49 to move the steady state output of the integrator away from virtual ground, i.e. the midpoint between the positive and negative supply voltages, to a desired value. This is necessary because if the feedback path across the integrator becomes shorted, the output of the integrator will remain at virtual ground, i.e. +2.5 volts for a system with supply voltages of +5 volts and 0 volts. In order to detect this failure, the acceptable range of integrator output voltages must be biased away from virtual ground, typically to a range of about +2.6 volts to +4.0 volts for normal operating conditions.

If the feedback path across the integrator becomes open, the integrator amplifier will pass all the double frequency components created by the demodulator. This double-frequency signal, when passed through the window comparator, will result in a stream of digital "ones" and "zeros" as the amplifier output transitions through the trip limits. Low pass filter 44 reduces this pulse stream to a dc voltage which is detected by the built-in test logic as a failure.

The output of summing circuit 49 is amplified by an amplifier 51 and applied to an amplitude modulator 52 to modulate the output voltage from voltage comparator 33. The output of the voltage comparator is a rail-to-rail square wave, and the modulator adjusts the peak-to-peak amplitude of that square wave to provide a variable drive voltage for the drive tines of the tuning fork.

The square wave from the modulator is applied to the drive tines through a multiplexer 53 which is controlled by a signal from the logic circuitry. It is also applied to the input of a bandpass filter 54 with a gain of 1.0 at its center frequency which is approximately equal to the natural frequency of the drive mode of the tuning fork. This filter significantly attenuates the harmonic content of the square wave, and produces another drive signal which is nearly a pure sine wave. That signal is applied to a second input of the multiplexer.

The peak-to-peak voltage of the square wave drive signal rises more rapidly and results in a faster turn-on than the sine wave. It is applied to the drive tines during the initial phase of turn-on to minimize turn-on time. Once the amplitude of the tuning fork oscillations reaches a level such that the output of integrator 38 exceeds the lower control limit of window comparator 39, the built-in test logic generates a command signal to the multiplexer to switch its output from the square wave to the sine wave. The relatively harmonic-free sine wave is then used to drive the tuning fork for the remainder of its operation until the next turn-on sequence.

This provides the advantages of both types of drive signals without the disadvantages of either. The square wave provides more rapid onset of fork oscillation and stabilization at the amplitude control level. However, it also has a high harmonic content which can, in some instances, couple to higher order modes of the tuning fork structure and cause undesired bias shifts in the sensor output. The sine wave is relatively free of such harmonics, and it couples only to the fundamental drive frequency. However a sine wave rises more slowly and produces a slower turn-on than the square wave. Consequently it is not as good for start-up operation.

In a preferred embodiment, the circuitry for the sensor is constructed in integrated form as an application specific integrated circuit (ASIC). The tuning fork and the EEPROM are external to the ASIC, and compensation values can be loaded via computer interface into the EEPROM through the digital logic in the ASIC. In one presently preferred embodiment, the ASIC has only three connector terminals: +5 volts, ground (0 volts), and the output signal.

The invention has a number of important features and advantages. The use of the square wave drive signal during start-up and the sine wave drive signal during normal operation provides the advantages of both types of drive signals without the disadvantages of either. The AGC control loop is compatible with external programming of the fork drive amplitude and scale factor. Thus, the scale factor of each unit can be corrected for minor variations in individual tuning fork characteristics so that each rate sensor produced can have the proper scale factor output. By monitoring a signal in the drive loop with a window comparator, a number of different types of failures can be detected.

It is apparent from the foregoing that a new and improved inertial rate sensor and method have been provided. While only certain presently preferred embodiments have been described in detail, as will be apparent to those familiar with the art, certain changes and modifications can be made without departing from the scope of the invention as defined by the following claims.

What is claimed is:

1. In an inertial rate sensing system: a vibratory rate sensing element, a drive circuit including means for initially applying a square wave drive signal to the rate sensing element and thereafter applying a sine wave drive signal to the rate sensing element, a pickup circuit coupled to the rate sensing element for providing an output signal corresponding to movement of the rate sensing element, means for adjusting the magnitude of the drive signals to set a scale factor which determines the sensitivity of the system, and means for monitoring a signal in the drive circuit to detect a failure in the system.

2. The system of claim 1 wherein the drive circuit comprises a servo loop which includes means for adding a reference signal to a signal which represents the amplitude of drive mode oscillation in the rate sensing element, and means for maintaining the sum of the reference signal and the signal which represents the amplitude of drive mode oscillation in the rate sensing element at a predetermined level whereby the amplitude of drive mode oscillation is determined by the reference signal.

3. The system of claim 2 wherein the means for maintaining the sum of the two signals at a predetermined level comprises an integrator having an input which is maintained at a zero level during steady state conditions.

4. The system of claim 2 wherein the reference signal includes both a fixed component and a programmable component.

5. The system of claim 4 including an EEPROM in which data for the programmable component is stored, digital logic for accessing the data in the EEPROM, and means for converting the accessed data to analog form for use as the programmable component of the reference signal.

6. The system of claim 1 wherein the means for applying the square wave drive signal and the sine wave drive signal comprises means for generating a square wave signal, means responsive to the square wave signal for producing a sine wave signal, and means for selectively applying either the square wave signal or the sine wave signal to the rate sensing element.

7. The system of claim 1 including means for providing a voltage corresponding to a current flowing between drive electrodes on the rate sensing element when the rate sensing element is oscillating, a voltage comparator responsive to that voltage for providing a square wave voltage, means responsive to the square wave voltage for producing a sine wave voltage having the same frequency as the square wave voltage, and a multiplexer for selectively applying either the square wave voltage or the sine wave voltage to the rate sensing element.

8. The system of claim 7 wherein the means for adjusting the magnitude of the drive signals includes an amplitude modulator through which the square wave voltage is passed.

9. The system of claim 1 wherein the means for monitoring the signal in the drive circuit comprises a window comparator which detects a failure when that signal is outside predetermined upper and lower limits.

10. The system of claim 9 including means for normally biasing the monitored signal away from a mid level between the upper and lower limits so that the window comparator can detect a failure which drives the monitored signal to the mid level.

11. The system of claim 9 wherein the window comparator comprises a pair of comparators, means for applying the monitored signal to one input of each of the two comparators, means for applying a lower limit reference signal to a second input of one of the comparators, means for applying an upper limit reference signal to a second input of the other comparator, and an inverting OR gate connected to the outputs of the two comparators for delivering an output signal if the monitored signal becomes smaller than the lower limit reference signal or larger than the upper limit reference signal.

12. In a method of sensing inertial rate, the steps of: initially applying a square wave drive signal to a vibratory rate sensing element and thereafter applying a sine wave drive signal to the rate sensing element, providing an output signal corresponding to movement of the rate sensing element, adjusting the magnitude of the drive signals to set a scale factor which determines the responsiveness of the rate sensing element to movement, and monitoring a signal derived from the drive signals to detect a failure.

13. The method of claim 12 including the steps of adding a reference signal to a signal which represents the amplitude of drive mode oscillation in the rate sensing element, and maintaining the sum of the reference signal and the signal which represents the amplitude of drive mode oscillation in the rate sensing element at a predetermined level in a servo loop whereby the amplitude of drive mode oscillation is determined by the reference signal.

14. The method of claim 13 wherein the sum of the two signals is maintained at a zero level at the input of an integrator in the servo loop during steady state conditions.

15. The method of claim 13 wherein the reference signal includes both a fixed component and a programmable component.

16. The method of claim 15 including the steps of storing data for the programmable component in an EEPROM, accessing the data in the EEPROM with digital logic, and converting the accessed data to analog form for use as the programmable component of the reference signal.

17. The method of claim 12 wherein the square wave drive signal and the sine wave drive signal are applied to the rate sensing element by generating a square wave signal, producing a sine wave signal corresponding to the square wave signal, and selectively applying either the square wave signal or the sine wave signal to the rate sensing element.

18. The method of claim 12 including the steps of providing a voltage corresponding to current flowing between drive electrodes on the rate sensing element when the rate sensing element is oscillating, providing a square wave voltage in response to the voltage corresponding to current, filtering the square wave voltage to provide a sine wave voltage having the same frequency as the square wave voltage, and selectively applying either the square wave voltage or the sine wave voltage to the rate sensing element.

19. The method of claim 18 wherein the magnitude of the drive signals is adjusted by amplitude modulation of the square wave voltage.

20. The method of claim 12 wherein the signal derived from the drive signals is monitored by a window comparator which detects a failure when that signal is outside predetermined upper and lower limits.

21. The method of claim 20 including the step of biasing the monitored signal away from a mid level between the upper and lower limits so that the window comparator can detect a failure which drives the monitored signal to the mid level.

22. The method of claim 12 wherein the signal derived from the drive signals is monitored by applying the monitored signal to one input of each of two comparators, applying a lower limit reference signal to a second input of one of the comparators, means for applying an upper limit reference signal to a second input of the other comparator, and delivering an output signal if the monitored signal becomes smaller than the lower limit reference signal or larger than the upper limit reference signal.

23. In an inertial rate sensing system: a vibratory rate sensing element, a drive circuit for applying a drive signal to the rate sensing element, and a pickup circuit coupled to the rate sensing element for providing an output signal corresponding to movement of the rate sensing element, the drive circuit comprising a servo loop which includes a current-to-voltage converter responsive to a current flowing between drive electrodes on the rate sensing element when the rate sensing element is oscillating, means for demodulating the output of the current-to-voltage converter to provide a voltage which represents the amplitude of drive mode oscillation in the rate sensing element, a summer for adding a fixed scale factor reference voltage and a programmable scale factor reference voltage to the voltage from the demodulator, an integrator responsive to the output of the summer, a voltage comparator responsive to the output of the current-to-voltage converter for providing a square wave, an amplitude modulator for modulating the square wave in accordance with the output of the integrator, a bandpass filter responsive to the square wave for producing a sine wave, and a multiplexer for selectively applying either the square wave or the sine wave to the rate sensing element as the drive signal.

24. The system of claim 23 further including a window comparator for monitoring the output of the integrator and detecting the occurrence of a failure in the drive circuit when the output of the integrator is outside predetermined upper and lower limits.

25. The system of claim 24 wherein the window comparator comprises a pair of comparators, means for applying the output of the integrator to one input of each of the two comparators, means for applying a lower limit reference signal to a second input of one of the comparators, means for applying an upper limit reference signal to a second input of the other comparator, and an inverting OR gate connected to the outputs of the two comparators for delivering an output signal if the output of the integrator becomes smaller than the lower limit reference signal or larger than the upper limit reference signal.

26. The system of claim 24 including means for normally biasing the output of the integrator away from a mid level between the upper and lower limits so that the window comparator can detect a failure which drives the output of the integrator to the mid level.

27. In an inertial rate sensing system: a vibratory rate sensing element, a drive circuit including means for initially applying a square wave drive signal to the rate sensing element and thereafter applying a sine wave drive signal to the rate sensing element, and a pickup circuit coupled to the rate sensing element for providing an output signal corresponding to movement of the rate sensing element.

28. The system of claim 27 wherein the means for applying the square wave and sine wave drive signals comprises means for providing a square wave, means responsive to the square wave for providing a sine wave, and means for selectively applying either the square wave or the sine wave to the rate sensing element as a drive signal.

29. The system of claim 27 including means for adjusting the magnitude of the square wave drive signal and the sine wave drive signal to set a scale factor which determines the sensitivity of the system.

30. The system of claim 27 including means for monitoring a signal in the drive circuit to detect a failure in the system.

31. In a method of sensing inertial rate, the steps of: initially applying a square wave drive signal to a vibratory rate sensing element and thereafter applying a sine wave drive signal to the rate sensing element, and providing an output signal corresponding to movement of the rate sensing element.

32. The method of claim 31 including the step of adjusting the magnitude of the square wave drive signal and the sine wave drive signal to set a scale factor which determines the responsiveness of the rate sensing element to movement.

33. The method of claim 27 including the step of monitoring a signal derived from the drive signals to detect a failure.

34. In an inertial rate sensing system:
a vibratory rate sensing element;
a drive circuit comprising a servo loop which includes means for adding a reference signal having both a fixed component and a programmable component to a signal which represents the amplitude of drive mode oscillation in the rate sensing element, and means for maintaining the sum of the reference signal and the signal which represents the amplitude of drive mode oscillation in the rate sensing element at a predetermined level whereby the amplitude of drive mode oscillation is determined by the reference signal;
an EEPROM in which data for the programmable component of the reference signal is stored;
digital logic for accessing the data in the EEPROM;
means for converting the accessed data to analog form for use as the programmable component of the reference signal; and
a pickup circuit coupled to the rate sensing element for providing an output signal corresponding to movement of the rate sensing element.

35. The system of claim 34 wherein the means for maintaining the sum of the reference signal and the signal which represents the amplitude of drive mode oscillation in the rate sensing element at a predetermined level comprises an integrator having an input which is maintained at a zero level during steady state conditions.

36. In a method of sensing inertial rate, the steps of: applying a drive signal to a vibratory rate sensing element to produce oscillation, monitoring signals produced by movement of the rate sensing element to provide an output signal, providing a signal corresponding to the amplitude of drive mode oscillation in the rate sensing element, adding a reference signal having both a fixed component and a programmable component to the signal corresponding to the amplitude of drive mode oscillation, storing data for the programmable component in an EEPROM, accessing the data in the EEPROM with digital logic, converting the accessed data to analog form for use as the programmable component of the reference signal, and maintaining the sum of the reference signal and the signal corresponding to the amplitude of driver mode oscillation in the rate sensing element at a predetermined level in a servo loop whereby the amplitude of drive mode oscillation is determined by the reference signal.

37. The method of claim 36 wherein the sum of the reference signal and the signal corresponding to the amplitude of drive mode oscillation in the rate sensing element is maintained at a zero level at the input of an integrator in the servo loop during steady state conditions.

38. In an inertial rate sensor: means for providing a voltage corresponding to a current flowing between drive electrodes on a vibratory rate sensing element, a voltage comparator responsive to that voltage for providing a square wave voltage, means responsive to the square wave voltage for producing a sine wave voltage having the same frequency as the square wave voltage, and a multiplexer for selectively applying either the square wave voltage or the sine wave voltage to the rate sensing element as a drive signal.

39. The system of claim 38 including an amplitude modulator through which the square wave voltage is passed in order to adjust the magnitude of the drive signal.

40. In a method of sensing inertial rate, the steps of: providing a voltage corresponding to current flowing between drive electrodes on a vibratory rate sensing element, providing a square wave voltage in response to the voltage corresponding to current, filtering the square wave voltage to provide a sine wave voltage having the same frequency as the square wave voltage, and selectively applying either the square wave voltage or the sine wave voltage to the rate sensing element.

41. The method of claim 40 including the step of modulating the amplitude of the square wave voltage to adjust the amplitude of the voltage applied to the rate sensing element.

42. In an inertial rate sensing system: a vibratory rate sensing element, a drive circuit for applying a drive signal to the rate sensing element, a pickup circuit coupled to the rate sensing element for providing an output signal corresponding to movement of the rate sensing element, and means including a window comparator for detecting a failure in the system by monitoring a signal in the drive circuit and detecting a failure when the monitored signal is outside predetermined upper and lower limits.

43. The system of claim 42 including means for normally biasing the monitored signal away from a mid level between the upper and lower limits so that the window comparator can detect a failure which drives the monitored signal to the mid level.

44. The system of claim 42 wherein the window comparator comprises a pair of comparators, means for applying the monitored signal to one input of each of the two comparators, means for applying a lower limit reference signal to a second input of one of the comparators, means for applying an upper limit reference signal to a second input of the other comparator, and an inverting OR gate connected to the outputs of the two comparators for delivering an output signal if the monitored signal becomes smaller than the lower limit reference signal or larger than the upper limit reference signal.

45. In a method of sensing inertial rate, the steps of: applying a drive signal to a vibratory rate sensing element to produce oscillation, monitoring signals produced by movement of the rate sensing element to provide an output signal, and monitoring a signal derived from the drive signal with a window comparator to detect a failure when the monitored signal is outside predetermined upper and lower limits.

46. The method of claim 45 including the step of biasing the monitored signal away from a mid level between the upper and lower limits so that the window comparator can detect a failure which drives the monitored signal to the mid level.

47. The method of claim 45 wherein the signal derived from the drive signal is monitored by applying the monitored signal to one input of each of two comparators, applying a lower limit reference signal to a second input of one of the comparators, means for applying an upper limit reference signal to a second input of the other comparator, and delivering an output signal if the monitored signal becomes smaller than the lower limit reference signal or larger than the upper limit reference signal.

* * * * *